US011487894B2

(12) United States Patent
Bent et al.

(10) Patent No.: US 11,487,894 B2
(45) Date of Patent: *Nov. 1, 2022

(54) PERFORMING SECURE QUERIES FROM A HIGHER SECURITY DOMAIN OF INFORMATION IN A LOWER SECURITY DOMAIN

(71) Applicant: INTERNATIONAL BUSINESS MACHINES CORPORATION, Armonk, NY (US)

(72) Inventors: Graham A. Bent, Winchester (GB); Flavio A. Bergamaschi, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 16/691,962

(22) Filed: Nov. 22, 2019

(65) Prior Publication Data
US 2020/0089906 A1 Mar. 19, 2020

Related U.S. Application Data

(63) Continuation of application No. 16/040,874, filed on Jul. 20, 2018, now Pat. No. 10,572,677, which is a
(Continued)

(51) Int. Cl.
G06F 21/62 (2013.01)
H04L 9/00 (2022.01)
(Continued)

(52) U.S. Cl.
CPC .......... G06F 21/6227 (2013.01); H04L 9/008 (2013.01); H04L 9/0825 (2013.01);
(Continued)

(58) Field of Classification Search
CPC ..... H04L 9/008; H04L 9/0618; H04L 9/0825; H04L 9/14; H04L 9/30; H04L 63/0428;
(Continued)

(56) References Cited

U.S. PATENT DOCUMENTS 6,920,495 B1* 7/2005 Fuselier .................. G06F 16/95
709/224
7,055,027 B1* 5/2006 Gunter ................ H04L 63/0428
709/223
(Continued)

FOREIGN PATENT DOCUMENTS

WO 2014137392 A1 7/2014
WO 2014137394 A1 9/2014

OTHER PUBLICATIONS

List of IBM Patents or Applications Treated as Related, Nov. 22, 2019, 2 pgs.
(Continued)

Primary Examiner — Linglan Edwards
(74) Attorney, Agent, or Firm — Brian Restauro; Matthew M. Hulihan; Heslin Rothenberg Farley & Mesiti PC

(57) ABSTRACT

A method generates, in a higher security domain (SD), public and secret keys using a first homomorphic encryption scheme (HES), passes the public key to a first shared security zone (SSZ) between the higher SD and a lower SD and through the first SSZ to a second entity in the lower SD, passes a plain text query from the higher SD to the first SSZ, encrypts the plain text query using a second HES, passes the encrypted plain text query to the second entity, performs an oblivious query to generate an encrypted result, and passes that from the lower SD to a second SSZ located between the higher and lower SDs, passes the secret key from the higher SD to the second SSZ, and decrypts the encrypted result
(Continued)

using the secret key to generate a plain text result, and passes the plain text result to the higher SD.

18 Claims, 7 Drawing Sheets

Related U.S. Application Data continuation of application No. 15/254,811, filed on Sep. 1, 2016, now Pat. No. 10,095,880.

(51) Int. Cl.
| | |
|---|---|
| *H04L 9/08* | (2006.01) |
| *H04L 9/40* | (2022.01) |
| *H04L 9/14* | (2006.01) |
| *H04L 9/30* | (2006.01) |

(52) U.S. Cl.
CPC .............. *H04L 9/14* (2013.01); *H04L 9/30* (2013.01); *H04L 63/105* (2013.01); *H04L 63/0471* (2013.01)

(58) Field of Classification Search
CPC ............ H04L 63/0471; H04L 63/105; G06F 21/6227
See application file for complete search history.

(56) References Cited

U.S. PATENT DOCUMENTS

| | | | |
|---|---|---|---|
| 7,987,201 | B2 | 7/2011 | Ramzan |
| 8,498,415 | B2 | 6/2013 | Sy |
| 8,630,422 | B2 | 1/2014 | Gentry |
| 8,713,319 | B2 | 4/2014 | Allepuz et al. |
| 8,862,895 | B2 | 10/2014 | Rieffel et al. |
| 8,904,171 | B2 | 12/2014 | Clifton et al. |
| 9,031,229 | B1 | 5/2015 | Nita |
| 9,054,971 | B2 | 6/2015 | Kumar et al. |
| 9,087,212 | B2 | 6/2015 | Balakrishnan et al. |
| 9,281,941 | B2 | 3/2016 | Gentry et al. |
| 9,742,556 | B2 | 8/2017 | Bacon et al. |
| 9,846,785 | B2 | 12/2017 | Bacon et al. |
| 9,848,075 | B1* | 12/2017 | Ahmad ................. A61B 5/0022 |
| 10,015,007 | B2 | 7/2018 | Bacon et al. |
| 10,073,981 | B2* | 9/2018 | Arasu ..................... G06F 21/62 |
| 10,095,880 | B2 | 10/2018 | Bent et al. |
| 10,255,454 | B2* | 4/2019 | Kamara ................ G06F 16/284 |
| 10,268,834 | B2 | 4/2019 | Pourzandi et al. |
| 2009/0083546 | A1 | 3/2009 | Staddon et al. |
| 2011/0110525 | A1 | 5/2011 | Gentry |
| 2011/0283099 | A1 | 11/2011 | Nath et al. |
| 2012/0039473 | A1 | 2/2012 | Gentry et al. |
| 2012/0066510 | A1 | 3/2012 | Weinman |
| 2013/0329883 | A1 | 12/2013 | Tamayo-Rios |
| 2014/0059345 | A1 | 2/2014 | Camenisch |
| 2014/0207911 | A1* | 7/2014 | Kosmach ............ H04L 65/1083 709/218 |
| 2015/0039912 | A1 | 2/2015 | Payton et al. |
| 2015/0186857 | A1* | 7/2015 | Swinfen ................ G06Q 40/02 705/17 |
| 2015/0244517 | A1 | 8/2015 | Nita |
| 2015/0295716 | A1 | 10/2015 | Liu |
| 2016/0105402 | A1 | 4/2016 | Soon-Shiong et al. |
| 2017/0103227 | A1 | 4/2017 | Kerschbaum et al. |
| 2017/0124348 | A1 | 5/2017 | Pourzandi et al. |
| 2017/0149557 | A1 | 5/2017 | Bacon et al. |
| 2018/0060604 | A1 | 3/2018 | Bent et al. |
| 2018/0191692 | A1* | 7/2018 | Frank .................. H04L 63/0428 |
| 2018/0349632 | A1 | 12/2018 | Bent et al. |

OTHER PUBLICATIONS

Mani, Murali, "Enabling Secure Query Processing in the Cloud using Fully Homomorphic Encryption", Proceeding DanaC '13 Proceedings of the Second Workshop on Data Analytics in the Cloud, Jun. 23, 2013, pp. 36-40.

Gahi, Youssef, et al., "A Secure Database System using Homomorphic Encryption Schemes", DBKDA 2011: The Third International Conference on Advances in Databases, Knowledge, and Data Applications, 2011, pp. 54-58.

Palamakumbura, Sudharaka, et al., "Database Query Privacy using Homomorphic Encryptions", Information Theory (CWIT), 2015 IEEE 14th Canadian Workshop on Information Theory, Jul. 6-9, 2015, pp. 71-74.

Brakerski, Zvika, et al., "(Leveled) fully homomorphic encryption without bootstrapping." ITCS '12: Proceedings of the 3rd Conference on Innovations in Theoretical Computer Science, 2012, pp. 309-325.

Javier Herranz, "Restricted Adaptive Oblivious Transfer," International Association for Cryptologic Research, https://eprint.iacr.org/2008/182.pdf, Jul. 27, 2011, 19 pgs.

Xum Yi, et al., "Single-Database Private Information Retrieval From Fully Homomorphic Encryption," IEEE Transactions on Knowledge and Data Engineering, vol. 25, No. 5, May 2013, pp. 1125-1134.

Haibo Hu, et al., "Private search on key-value stores with hierarchical indexes", IEEE 30th International Conference on Data Engineering, pp. 628-639, 2014.

Yehuda Lindell, et al., "Secure Two-Party Computation via Cut-and-Choose Oblivious Transfer," International Association for Cryptologic Research, http://eprint.iacr.org/2010/284.pdf, Mar. 16, 2015, 40 pgs.

\* cited by examiner

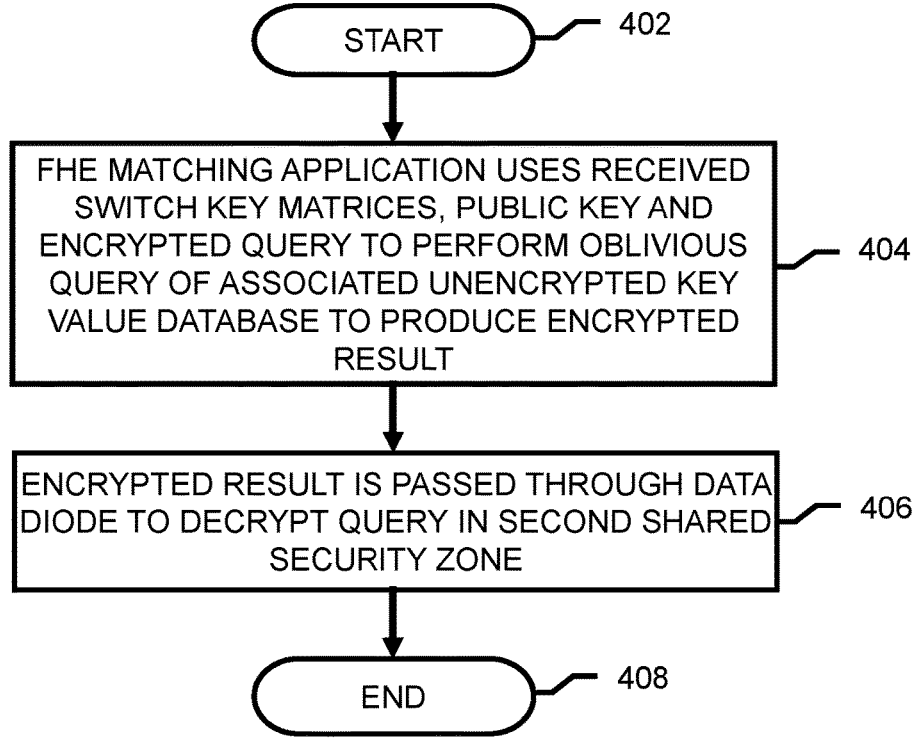

| QUERY | KEY (NAME) | COMPARISON | VALUE 1 (ADDRESS) | RESULT |
|---|---|---|---|---|
| ¤(e(BOB)) | (e(ALI)) | ¤(0) | e(RECORD A) | ¤(0) |
| ¤(e(BOB)) | (e(BOB)) | ¤(1) | e(RECORD B) | ¤(e(RECORD B)) |
| ¤(e(BOB)) | (e(CAT)) | ¤(0) | e(RECORD C) | ¤(0) |
| ¤(e(BOB)) | (e(DAN)) | ¤(0) | e(RECORD D) | ¤(0) |
|  |  |  |  |  |
|  |  |  | ANSWER: | ¤(e(RECORD B)) |

PERFORMING SECURE QUERIES FROM A HIGHER SECURITY DOMAIN OF INFORMATION IN A LOWER SECURITY DOMAIN

BACKGROUND

One of the major issues that are faced by multi-level secure systems is that queries propagating between security domains reveal information about intent. For example, a query from a classified domain, that is, a higher security domain, into an unclassified domain, that is, a lower security domain, for information reveals to the unclassified domain that the classified domain is interested in a particular topic. Since the classified domain does not want to reveal such intent, prior art solutions either seek to hide the source of the query by using proxies or simply bring the unclassified data into the classified domain. In the latter case, this results not only in the cost of hosting the information but also in managing the data at the higher classification.

SUMMARY

Aspects described herein relate to performing secure queries from a higher security domain of information in a lower security domain, and more specifically to performing secure queries from a higher security domain of information in a lower security domain without revealing any information through the use of a Fully Homomorphic Encryption firewall.

According to an embodiment of the invention, a computer-implemented method is provided for a first entity in a higher security domain to query a second entity in a lower security domain. The computer-implemented method generates, in the higher security domain, a public key and a secret key using a first homomorphic encryption scheme and passing the generated public key to a first shared security zone located between the higher security domain and the lower security domain and through the first shared security zone to the second entity in the lower security domain. The method passes a plain text query from the higher security domain to the first shared security zone, encrypts, in the first shared security zone, the plain text query using a second homomorphic encryption scheme to produce an encrypted plain text query, and passes the encrypted plain text query to the second entity in the lower security domain. The method performs, in the second entity in the lower security domain, an oblivious query based on the encrypted plain text query to generate an encrypted result, and passes the encrypted result from the lower security domain to a second shared security zone located between the higher security domain and the lower security domain via a data diode. The method passes the secret key from the higher security domain to the second shared security zone, and decrypts, in the second shared security zone, the encrypted result using the secret key to generate a plain text result. The method passes the plain text result to the higher security domain.

In accordance with another embodiment of the invention, a computer system is provided for a first entity in a higher security domain to query a second entity in a lower security domain. The computer system includes a memory and a processor in communication with the memory. The computer system is configured to perform a method. The method generates, in the higher security domain, a public key and a secret key using a first homomorphic encryption scheme and passing the generated public key to a first shared security zone located between the higher security domain and the lower security domain and through the first shared security zone to the second entity in the lower security domain. The method passes a plain text query from the higher security domain to the first shared security zone, encrypts, in the first shared security zone, the plain text query using a second homomorphic encryption scheme to produce an encrypted plain text query, and passes the encrypted plain text query to the second entity in the lower security domain. The method performs, in the second entity in the lower security domain, an oblivious query based on the encrypted plain text query to generate an encrypted result, and passes the encrypted result from the lower security domain to a second shared security zone located between the higher security domain and the lower security domain via a data diode. The method passes the secret key from the higher security domain to the second shared security zone, and decrypts, in the second shared security zone, the encrypted result using the secret key to generate a plain text result. The method passes the plain text result to the higher security domain.

In accordance with yet another embodiment of the invention, a computer program product is provided for a first entity in a higher security domain to query a second entity in a lower security domain, and the computer program product includes a computer readable storage medium having program instructions embodied therewith, the program instructions executable by a computer to perform a method. The method generates, in the higher security domain, a public key and a secret key using a first homomorphic encryption scheme and passing the generated public key to a first shared security zone located between the higher security domain and the lower security domain and through the first shared security zone to the second entity in the lower security domain. The method passes a plain text query from the higher security domain to the first shared security zone, encrypts, in the first shared security zone, the plain text query using a second homomorphic encryption scheme to produce an encrypted plain text query, and passes the encrypted plain text query to the second entity in the lower security domain. The method performs, in the second entity in the lower security domain, an oblivious query based on the encrypted plain text query to generate an encrypted result, and passes the encrypted result from the lower security domain to a second shared security zone located between the higher security domain and the lower security domain via a data diode. The method passes the secret key from the higher security domain to the second shared security zone, and decrypts, in the second shared security zone, the encrypted result using the secret key to generate a plain text result. The method passes the plain text result to the higher security domain.

Embodiments of the invention also provide a system for a first entity in a higher security domain to perform an oblivious query on a second entity in a lower security domain to generate an encrypted result, the first entity generating a public key and a secret key using a first homomorphic encryption scheme. The system includes: a first shared security zone, located between the higher security domain and the lower security domain, which receives the public key generated by the first entity in the higher security domain and passes the public key to the second entity in the lower security domain, and which includes: a query encryption module which receives a plain text query from the higher security domain, encrypts the plain text query using a second homomorphic encryption scheme to produce an encrypted plain text query and passes the encrypted plain text query to the second entity in the lower security domain; a data diode which receives an encrypted result from the second entity in the lower security zone; and a second shared security zone, located between the lower security domain and the higher security domain, which receives the secret key generated by the first entity in the higher security domain and which includes: a query decryption module which receives the encrypted result from the data diode, decrypts the encrypted result using the secret key to generate a plain text result, and passes the plain text result to the higher security domain.

In a system for a first entity in a higher security domain to perform an oblivious query on a second entity in a lower security domain to generate an encrypted result, the first shared security zone can further include a first validation module which validates the plain text query, the validating can include ensuring that the first entity is authorized to request the plain text query and the plain text query is valid for the second entity in the lower security domain. The second shared security zone can further include a second validation module which validates the plain text result, the validating including ensuring that the plain text result is valid and free from viruses. The first entity can further generate a plurality of switch key matrices using a fully homomorphic encryption scheme, and pass the generated plurality of switch key matrices through the first shared security zone to the second entity. The query encryption module can, in some examples, encrypt the plain text query only if the plain text query is successfully validated.

BRIEF DESCRIPTION OF THE DRAWINGS

Embodiments will now be described in more detail, by way of example only, with reference to the accompanying drawings, in which:

FIG. 4 is a flow chart of aspects associated with the lower security domain of FIG. 1 of a computer-implemented method in accordance with aspects described herein;

FIG. 5 is an example encoded key value table, in accordance with aspects described herein;

DETAILED DESCRIPTION

Figure 1:
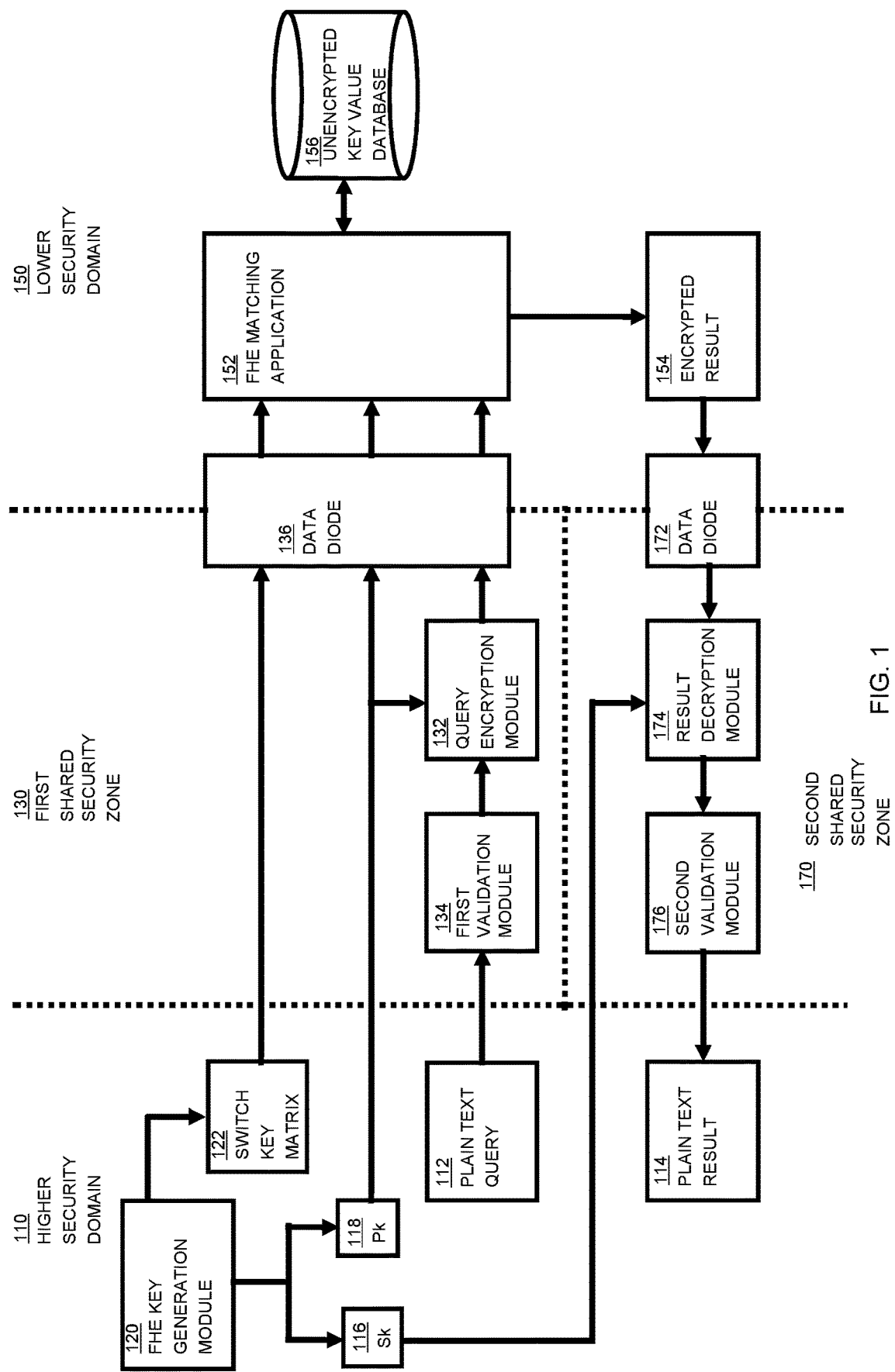
FIG. 1 is a block diagram of a system according, in accordance with aspects described herein.

FIG. 1 shows a computer system in accordance with aspects described herein having a higher security domain 110, a first shared security zone 130, a lower security domain 150 and a second shared security zone 170. The embodiment of FIG. 1 utilizes fully homomorphic encryption (FHE) to perform validated multilevel secure queries between the higher security domain 110 and the lower security domain 150 while guaranteeing that no information contained in the plain text query 112 is leaked into the lower security domain 150. Information contained within the plain text query 112 is cryptographically hidden as it passes through the first shared security zone 130 and is cryptographically revealed as it returns through the second shared security zone 170. An FHE matching application 152 in the lower security domain 150 responding to a plain text query 112 generated within the higher security domain 110 is able to perform homomorphic computation and return a correct encrypted result 154 without the FHE matching application 152 learning the details of the plain text query 112 or specific information about the encrypted result 154 that was returned. Additionally, the response, that is the plain text result 114, to the plain text query 112 is returned in an encrypted form which ensures that the lower security domain 150 learns nothing about the plain text query 112 or the response returned.

In computer security, an example shared security zone (e.g. 130, 170 of FIG. 1), sometimes referred to as a perimeter network, is a physical or logical subnetwork that contains and exposes an organization's external-facing services to a larger and untrusted network. In the embodiment of FIG. 1, the larger and untrusted network is the lower security domain 150. Although the lower security domain 150 is typically larger, aspects described herein are not limited to embodiments in which the lower security domain 150 is larger. The purpose of a shared security zone is to add an additional layer of security to an organization's local area network (LAN); an external network node only has direct access to equipment in the shared security zone, rather than any other part of the network.

FIG. 1 shows two shared security zones to ensure that no information is leaked from the higher security domain 110 to the lower security domain 150 and to ensure that a secret key 116 that can unlock an encrypted query generated by query encryption module 132 and response ciphertext, the encrypted result 154, cannot be transmitted to the lower security domain 150. Embodiments of the invention may include additional firewall rules to ensure that:

a) The plain text query 112 is a legitimate query and that the user generating the query is allowed to make the request;

b) The returned encrypted result 154 to the plain text query 112 is a valid response and can be checked for viruses and the like before it is returned to the higher security domain 110; and c) The secret key 116 that is used to decrypt the encrypted result 154 and that could be used to decrypt the plain text query, encrypted by the query encryption module 132, cannot be leaked to the lower security domain 150.

Higher security domain 110 includes an FHE key generation module 120 which generates corresponding secret key 116 and public key 118 and a switch key matrix 122. Plain text query 112 is also generated within higher security domain 110 and plain text result 114 is received in higher security domain 110. Generation and operation of these will be described below with reference to FIG. 2. First shared security zone 130, located between the higher security domain 110 and the lower security domain 150, includes a first validation module 134 and a query encryption module 132 which validate and encrypt, respectively, the plain text query 112 using public key 118 and a data diode 136. Data diode 136 protects first shared security zone from inbound attacks from lower security domain 150. Operation of these will be described below with reference to FIG. 3. Lower security domain 150 includes FHE matching application 152, an unencrypted key value database 156 and an encrypted result 154. FHE matching application 152 receives the encrypted query and uses it to perform an oblivious query of the unencrypted key value database 156. Operation of these will be described below with reference to FIG. 4. Second shared security zone 170 includes a data diode 172, a result decryption module 174 and a second validation module 176. Data diode 172 ensures that no data is leaked to the lower security domain 150. Result decryption module 174 and second validation module 176 decrypt and validate, respectively, the encrypted result 154 using secret key 116. Operation of these will be described below with reference to FIG. 8.

A computer-implemented method for a first entity in a higher security domain 110 to query a second entity 156 in a lower security domain 150 will now be described with reference to FIGS. 2 to 8.

Figure 2:
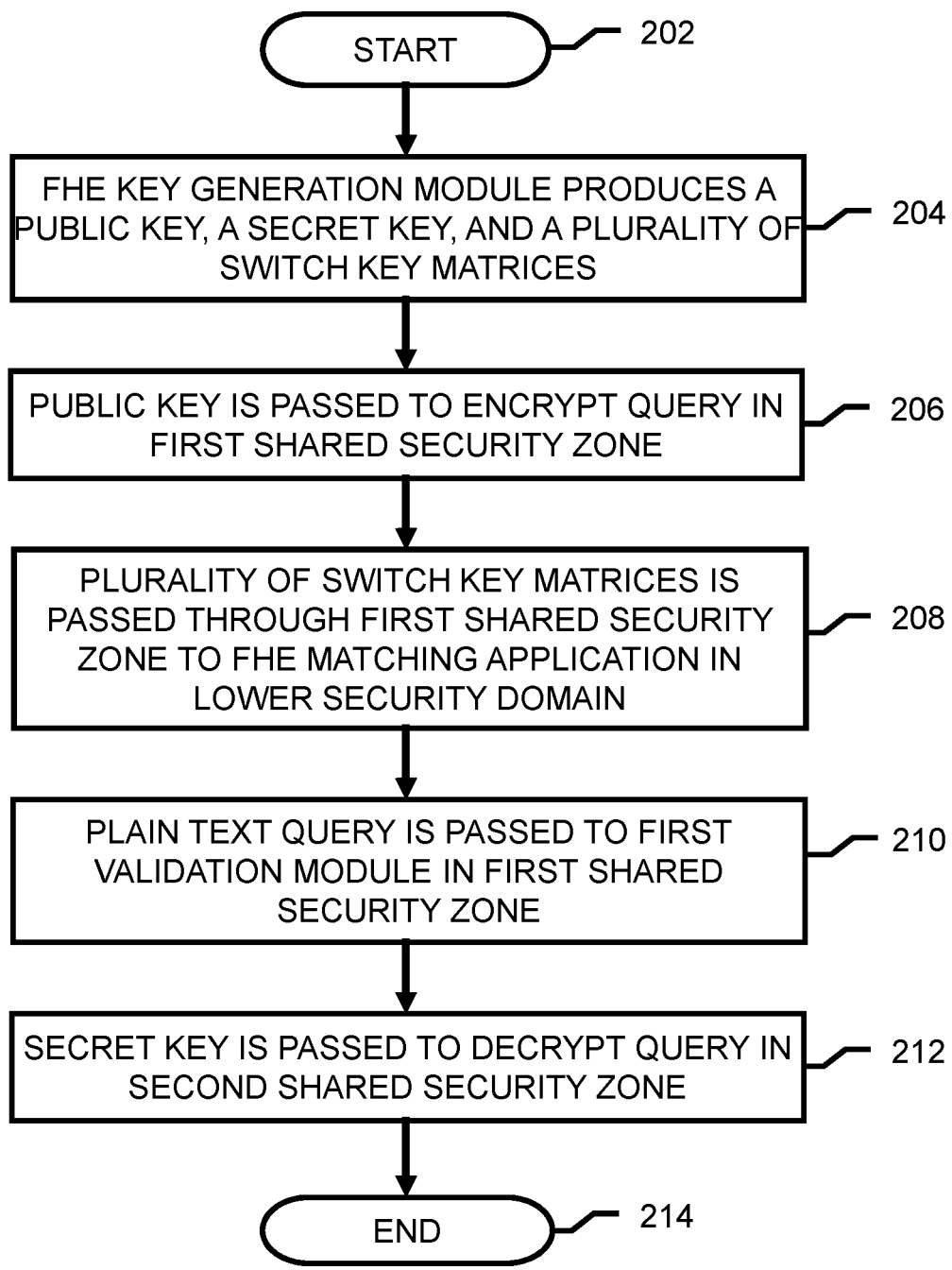
FIG. 2 is a flow chart of aspects associated with the higher security domain of FIG. 1 of a computer-implemented method in accordance with aspects described herein.

FIG. 2 is a flow diagram of aspects performed in a higher security domain 110 of FIG. 1 of an embodiment of a computer-implemented method in accordance with aspects described herein in order for a first entity in a higher security domain 110 to query a second entity in a lower security domain 150. The computer-implemented method starts at 202. At 204, an FHE key generation module 120 in the higher security domain 110 generates a public key (Pk) 118, a secret key (Sk) 116 and a plurality of switch key matrices 122, for instance using a fully homomorphic encryption (FHE) scheme. Such a scheme will be familiar to persons skilled in the art. Other embodiments of fully homomorphic encryption schemes may be used, including ones that do not use switch key matrices, but generate only a public key (Pk) 118 and a secret key (Sk) 116.

At 206, the generated public key (Pk) 118 is passed to the first shared security zone 130 in order to enable the query encryption module 132 in the first shared security zone 130 to encrypt the plain text query 112 and for the first shared security zone 130 to pass on the public key (Pk) 118 to the FHE matching application 152 in the lower security domain 150. At 208, the generated plurality of switch key matrices 120 are passed from the higher security domain 110 to the first shared security zone 130 in order for the first shared security zone 130 to pass these on to the FHE matching application 152 in the lower security domain 150. At 210, the plain text query 112 is passed from the higher security domain 110 to the first validation module 134 in the first shared security zone 130 in order to allow the first validation module 134 to validate the plain text query 112.

At 212, the secret key (Sk) 116 is passed from the higher security domain 110 to the result decryption module 174 in the second shared security zone 170 in order for it to decrypt the encrypted result 154. This aspect (212) is associated with decrypting the encrypted result 154 which is provided by the lower security domain 150 to the second shared security zone 170 as a response to the plain text query 112. Aspect 212 may therefore be carried out after the aspects of 210, or it may be carried out at a later stage, including, but not limited to, when the second shared security zone 170 indicates to the higher security domain 110 that an encrypted result 154 to the plain text query 112 has been received. In other embodiments, aspects of 212 may be carried out at any time between 210 and the encrypted result being decrypted. The computer-implemented method ends at 214.

Figure 3:
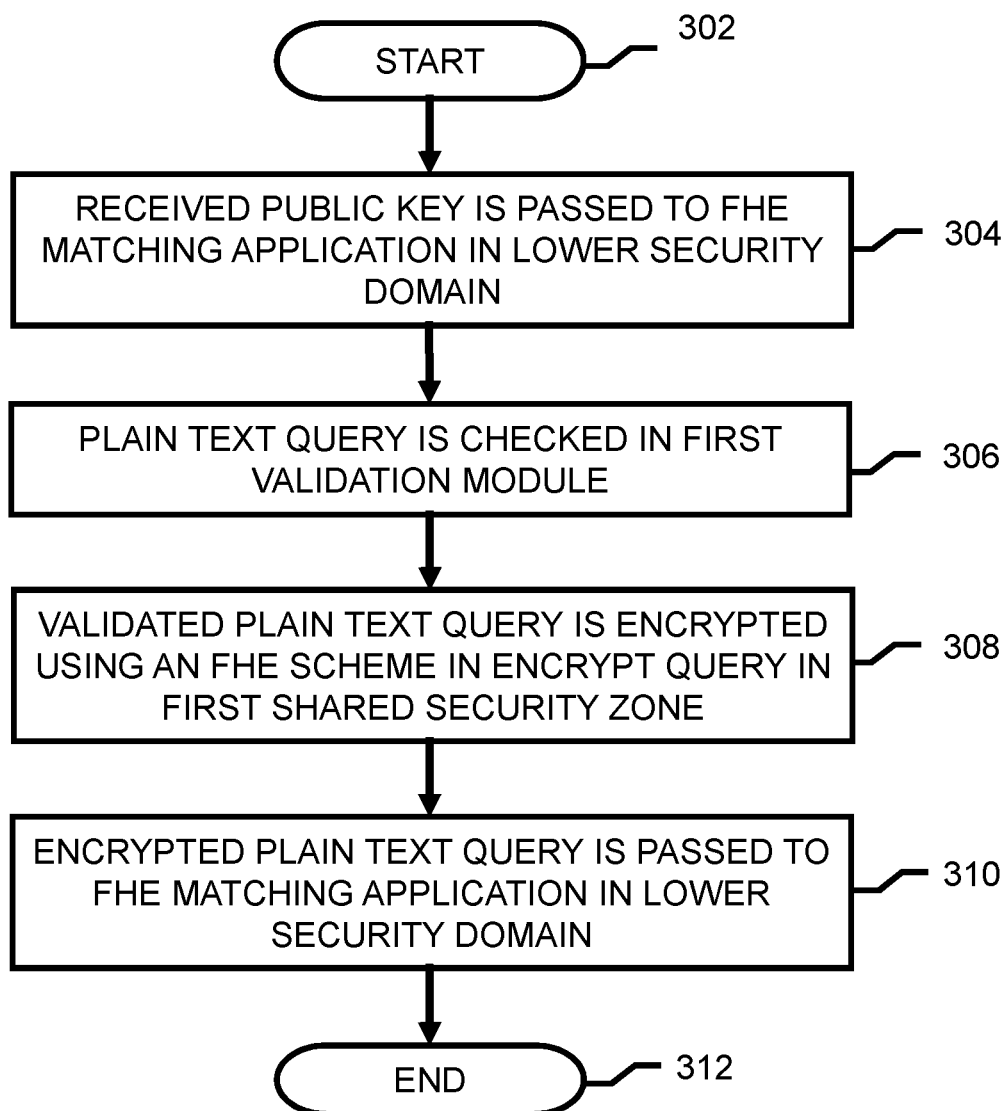
FIG. 3 is a flow chart of aspects associated with the first shared security zone of FIG. 1 of a computer-implemented method in accordance with aspects described herein.

FIG. 3 is a flow diagram of aspects performed in a first shared security zone 130 of an embodiment of a computer-implemented method in accordance with aspects described herein in order for a first entity in a higher security domain 110 to query a second entity in a lower security domain 150. The computer-implemented method starts at 302. At 304, the public key (Pk) 118 received from the higher security domain 110 at 206 (FIG. 2) is passed through to the FHE matching application 152 in the lower security domain 150. Optionally, at 306, first validation module 134, in the first shared security zone 130, validates the plain text query 112 received at 210 (FIG. 2). First validation module 134 may validate the plain text query 112 to determine whether the plain text query 112 is valid, that is, it is a legitimate query, to submit to the particular FHE matching application 152 and whether the user generating the plain text query 112 is authorized to make the request. Other validation steps may be made in addition to, or in place of, these validation steps or, in an embodiment, no validation steps may be carried out.

If the optional step of validation is not carried out, or the plain text query 112 is successfully validated at 306, then, at 308, query encryption module 132 in the first shared security zone 130 encrypts the plain text query 112 using an FHE scheme to produce an encrypted plain text query. If the plain text query 112 fails the validation step, then no further processing is done and the computer-implemented method ends. At 310, the encrypted plain text query is passed by the query encryption module 132 to the FHE matching application 152 in the lower security domain 150. The computer-implemented method ends at 312.

FIG. 4 is a flow diagram of aspects performed in a lower security domain 150 of an embodiment of a computer-implemented method in accordance with aspects described herein in order for a first entity in a higher security domain 110 to query a second entity in a lower security domain 150. The computer-implemented method starts at 402. At 404, the FHE matching application 152, in the lower security domain 150, uses the switch key matrices 122 received at 208 (FIG. 2), the public key (Pk) 118 received at 304 (FIG. 3) and the encrypted plain text query 112 received at 310 (FIG. 3) to perform an oblivious query of the associated unencrypted key value database 156. The oblivious query generates an encrypted result 154. At 406, the encrypted result 154 is passed through data diode 172 to the query decryption module 174 in the second shared security zone 170. Implementation of data diode 172 will be familiar to persons skilled in the art. Such data diodes 172 are sometimes referred to as unidirectional networks or unidirectional security gateways and allow data to travel in one direction only. The computer-implemented method ends at 408.

The unencrypted encoded key value database 156 will now be briefly described. Implementation of key value database 156 will be familiar to persons skilled in the art. FIG. 5 is an example of an unencrypted encoded key value database 156 in accordance with aspects described herein. Key value database 156 includes keys 504. In the first exemplary table 156, the keys 504 are the names of the subject nodes for which information is held. Although the first exemplary table 156 shows four names, Ali, Bob, Cat and Dan, embodiments of the present invention are not limited to having four records and are not limited to these particular names. In a second exemplary table, eighteen names may be used as keys, including, for example, Bob Jones, Vanessa Brown, Anitha Bregwig and fifteen others. Also in the exemplary table 156, value 1 506 is a field which contains the address associated with the name in the key field 504. Although the first exemplary table 156 shows four addresses, Address A, Address B, Address C and Address D, embodiments of the present invention are not limited to having four records and are not limited to these particular addresses. Further in the first exemplary table 156, value 2 508 is a field which contains account information associated with the name in key field 504 and value 3 510 is a field which contains balance information for the account of the value 2 508 field.

Figure 6:
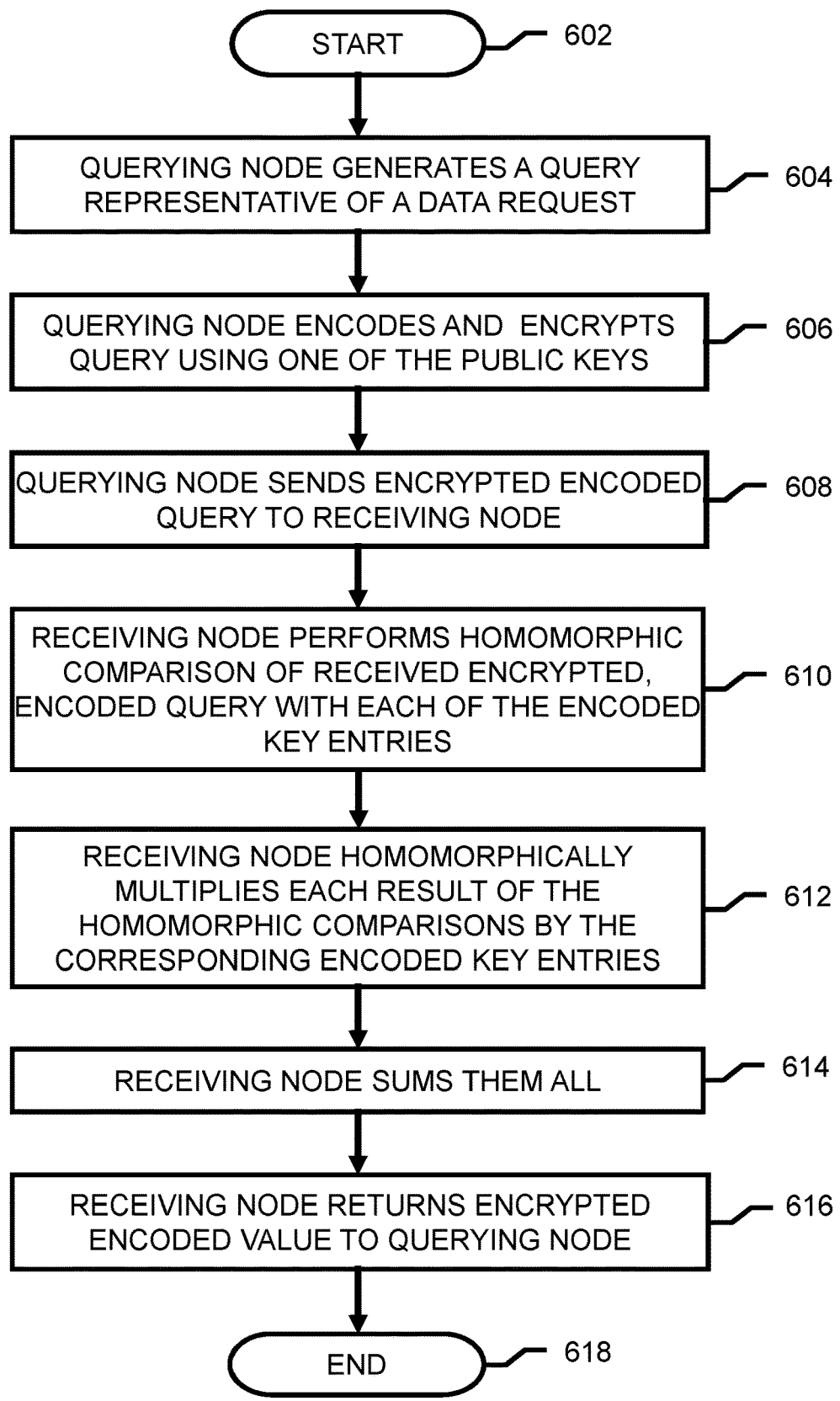
FIG. 6 is a flow chart of the higher security domain generating and sending a query and the lower security domain generating a result, in accordance with aspects described herein.

FIG. 6 is a flow chart of the higher security domain generating and sending a query and the lower security domain generating a result, in accordance with aspects described herein. FIG. 6 shows a flow chart of the higher security domain 110 generating and sending a plain text query 112 and the FHE matching application 152 generating a response. FIG. 6 starts at 602, and at 604, higher security domain 110 generates a plain text query 112 representative of a data request and encodes the query, e.g. according to a prior art FHE encryption method, using a polynomial ring having coefficients in a predetermined range and of a predetermined degree. Query encryption module 132 in first shared security zone 130 encrypts the encoded plain text query 112 using one of the generated public keys 118, and sends the encrypted, encoded plain text query 112 to FHE matching application 152 in the lower security domain 150. That is, the polynomial used has coefficients in the same predetermined range and of the same predetermined degree as that used by the lower security domain 150 to encode the key value table. For use with the first exemplary key value table 156 of FIG. 5, the query might be "Bob". For use in the second exemplary table, the query might be "Vanessa Brown". For both queries, the information requested might be the address value 1 506 associated with the name key 504. At 606, the query is first encoded by the higher security domain 110 generating a polynomial representation that corresponds with the same encoding as was used by the lower security domain 150 to encode the key value database 156. The first shared security zone 130 then encrypts the plain text query 112 with the received public key (Pk) 118. This produces a cryptotext encoded in the correct polynomial ring. At 608, the first shared security zone 130 sends the encrypted, encoded plain text query 112 to the lower security domain 150.

Figures 7, 8:
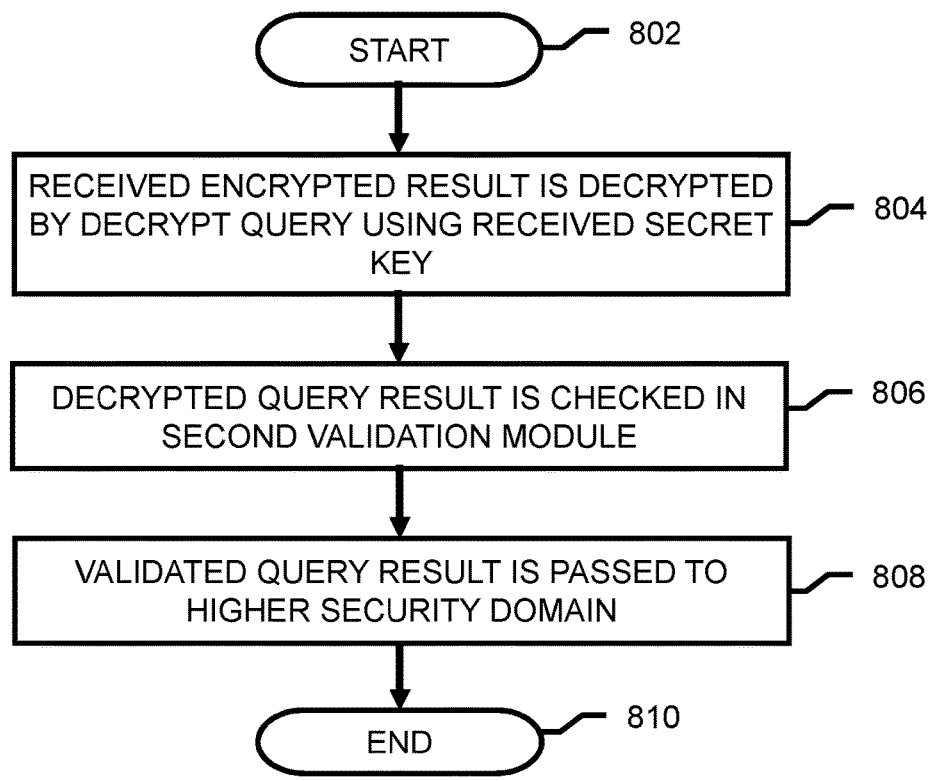
FIG. 7 is the example encoded key value of FIG. 5 together with the received encrypted query and the encrypted result of the query, in accordance with aspects described herein.
FIG. 8 is a flow chart of aspects associated with the second shared security zone of FIG. 1 of a computer-implemented method in accordance with aspects described herein.

FIG. 7 is the example encoded key value of FIG. 5 together with the received encrypted query and the encrypted result of the query, in accordance with aspects described herein. The encrypted, encoded query generated by the query encryption module 132 is shown in the query column 702. In FIG. 7, encryption is indicated by the symbol "a" and encoding is indicated by the symbol "e". The encoded key 504 associated with the unencrypted key value database 156 is shown in the key column 504.

Returning to FIG. 6, at 610, the lower security domain 150 performs a homomorphic comparison of the received encrypted, encoded query 702 with each of the encoded key entries 504 in the encoded key-value database 156 to determine, for each key entry 504, a comparison result 704. The homomorphic comparison produces a result 704 of an encryption of "0" ($¤(0)$) if there is no match between the encoded, encrypted query 702 and the encoded key value 504. The encryption is of "0" encrypted with the public key Pk 118 of the higher security domain 110, so only the higher security domain 110 can decrypt it using its secret key Sk 116. In FIG. 1, the secret key Sk 116 has been passed to query decryption module 174 in the second shared security zone 170 and so result decryption module 174 is able to decode it. Since the key 504 field includes a list of unique values, there can be at most one matching value. In the exemplary key value table 502, only the key 504 of the second record in the table 502 matches the query and produces a comparison result 704 of an encryption of "1" ($¤(1)$). The lower security domain 150 generates an encryption of "1" by encrypting "1" with the public key Pk 118 of the higher security domain 110, so only the higher security domain 110 can decrypt it using its secret key Sk 116. Similarly, the lower security domain 150 also generates an encryption of "0" by encrypting "0" with the public key Pk 118 of the higher security domain 110, so only the higher security domain 110 can decrypt it using its secret key Sk 116. Thus, the lower security domain 150 cannot determine whether any individual one of the comparison results is an encryption of "0" or an encryption of "1". The key 504 for each of the other records in the table do not match the query and so each of these produce a comparison result of an encryption of "0".

At 612, the FHE matching application 154 in the lower security domain 150 homomorphically multiplies, for each record, the result 704 of the homomorphic comparison and the address value 1 506. In the first exemplary table, the three instances of a comparison result 704 of an encryption of "0" when each multiplied by their corresponding address value 1 506 produces a result 706 of an encryption of "0". The one instance of a comparison result 704 of an encryption of "1" when multiplied by encoded RECORD B produces a result 706 of encrypted, encoded RECORD B.

At 614, the FHE matching application 154 in the lower security domain 150 sums the encrypted, encoded values 706 for each of the value entries and returning the summed encrypted, encoded result to the higher security domain 110. In the first exemplary table, the three instances of an encryption of "0" summed with the one instance of encrypted, encoded RECORD B produces a result of encrypted, encoded RECORD B. Again, as stated above with respect to the encryption of "0" and the encryption of "1", the encrypted, encoded record B has been encrypted with the public key Pk 118 of the higher security domain 110, so only the higher security domain 110 can decrypt it using its secret key Sk 116. In FIG. 1, the secret key Sk 116 has been passed to query decryption module 174 in the second shared security zone 170 and so query decryption module is able to decrypt it. At 616, the lower security domain 150 returns the encrypted, encoded result to the second shared security zone 170. The method of FIG. 6 ends at 618.

FIG. 8 is a flow diagram of aspects performed in a second shared security zone 170 of an embodiment of a computer-implemented method in accordance with aspects described herein in order for a first entity in a higher security domain 110 to query a second entity in a lower security domain 150. The computer-implemented method starts at 802. If the secret key was not passed from the higher security domain 110 to the second shared security zone 170 earlier, it is now passed (212 of FIG. 2), from the higher security domain 110 to the second shared security zone 170. At 804, the encrypted result 154 received at 406 (FIG. 4) is decrypted by the result decryption module 174, in the second shared security zone 170, using the secret key (Sk) 116 received at 212 (FIG. 2), to generate a plain text result 114. Optionally, at 806, the plain text result 114 is validated by the second validation module 176, in the second shared security zone 170, for validity and for freedom from viruses and the like. Other validation steps may be made in addition to, or in place of, these validation steps or, in an embodiment, no validation steps may be carried out. At 808, the validated, decrypted query result is passed by the second validation module 176 to the higher security domain 110. The computer-implemented method ends at 810.

Figure 9:
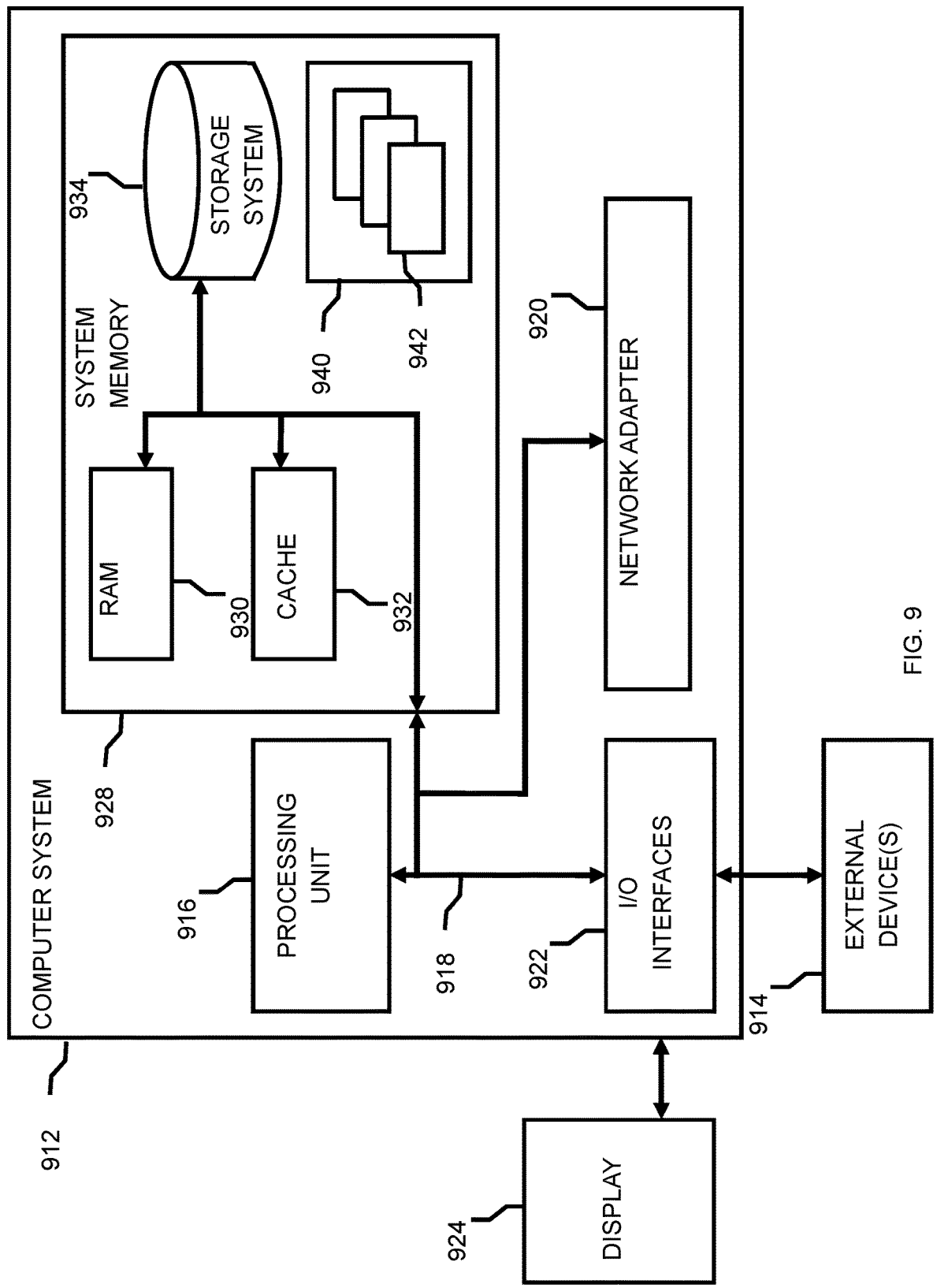
FIG. 9 depicts a computer system in which embodiments of the present invention may be implemented.

FIG. 9 is a schematic of an example of computing system (also referred to herein as a "computer system" or "computer") in which embodiments of the present invention may be implemented. Computing system 912 is only one example of a suitable computing system and is not intended to suggest any limitation as to the scope of use or functionality of embodiments of the invention described herein. Regardless, computing system 912 is capable of being implemented and/or performing any of the functionality set forth hereinabove.

Computer system/server 912 is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 is shown in the form of a general-purpose computing device. The components of computer system/server 912 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 912 typically includes a variety of computer system readable media. Such media may be any available media that is accessible by computer system/server 912, and it includes both volatile and non-volatile media, removable and non-removable media.

System memory 928 can include computer system readable media in the form of volatile memory, such as random access memory (RAM) 930 and/or cache memory 932. Computer system/server 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the invention.

Program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of aspects described herein.

Computer system/server 912 may also communicate with one or more external devices 914 such as a keyboard, a pointing device, a display 924, etc.; one or more devices that enable a user to interact with computer system/server 912; and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed.

Many modifications and variations will be apparent to those of ordinary skill in the art. The embodiments were chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving, by a security zone between a first security domain and a second security domain, the first security domain being a higher-level security domain than the second security domain, an encrypted result from the second security domain, wherein the first security domain comprises a local area network (LAN), the second security domain comprises an external network that is external to the LAN and that includes external network nodes, and the security zone comprises a perimeter network between the LAN and the external network, and wherein the encrypted result is generated by the second security domain based on an encrypted, encoded query produced using a homomorphic encryption scheme, and further based the second security domain comparing the encrypted, encoded query with each of a plurality of encoded key-values of a key-value database to obtain a plurality of encrypted comparison results and using the plurality of encrypted comparison results and a plurality of corresponding encoded address values to mathematically compute the encrypted result;
receiving, by the security zone, a secret key from the first security domain, and decrypting, in the security zone, the encrypted result using the secret key to generate a result; and
passing the result to the first security domain.

2. The computer-implemented method of claim 1, wherein the encrypted query is based on an initial query by a first entity of the LAN to query a second entity of the external network, wherein the encrypted result is generated from performance of an oblivious query based on the encrypted query, and the encrypted query is produced based on encryption of the initial query using the homomorphic encryption scheme.

3. The computer-implemented method of claim 2, wherein the encryption of the initial query using the homomorphic encryption scheme is based on the initial query being successfully validated by ensuring that the first entity of the LAN is authorized to request the initial query to query the second entity of the external network.

4. The computer-implemented method of claim 1, wherein the security zone is shared between the first security domain and the second security domain.

5. The computer-implemented method of claim 1, further comprising validating the result, the validating comprising ensuring that the result is valid and free from viruses.

6. The computer-implemented method of claim 1, wherein the encrypted query is based on an initial query by a first entity of the LAN to query a second entity of the external network, wherein the homomorphic encryption scheme used in the encrypting the initial query to produce the encrypted query is a second homomorphic encryption scheme, and wherein the secret key received from the first security domain is generated using a first homomorphic encryption scheme.

7. A computer system comprising:
a memory; and
a processor in communication with the memory, wherein the computer system is configured to perform a method comprising:
receiving, by a security zone between a first security domain and a second security domain, the first security domain being a higher-level security domain than the second security domain, an encrypted result from the second security domain, wherein the first security domain comprises a local area network (LAN), the second security domain comprises an external network that is external to the LAN and that includes external network nodes, and the security zone comprises a perimeter network between the LAN and the external network, and wherein the encrypted result is generated by the second security domain based on an encrypted, encoded query produced using a homomorphic encryption scheme, and further based the second security domain comparing the encrypted, encoded query with each of a plurality of encoded key-values of a key-value database to obtain a plurality of encrypted comparison results and using the plurality of encrypted comparison results and a plurality of corresponding encoded address values to mathematically compute the encrypted result;
receiving, by the security zone, a secret key from the first security domain, and decrypting, in the security zone, the encrypted result using the secret key to generate a result; and
passing the result to the first security domain.

8. The computer system of claim 7, wherein the encrypted query is based on an initial query by a first entity of the LAN to query a second entity of the external network, wherein the encrypted result is generated from performance of an oblivious query based on the encrypted query, and the encrypted query is produced based on encryption of the initial query using the homomorphic encryption scheme.

9. The computer system of claim 8, wherein the encryption of the initial query using the homomorphic encryption scheme is based on the initial query being successfully validated by ensuring that the first entity of the LAN is authorized to request the initial query to query the second entity of the external network.

10. The computer system of claim 7, wherein the security zone is shared between the first security domain and the second security domain.

11. The computer system of claim 7, wherein the method further comprises validating the result, the validating comprising ensuring that the result is valid and free from viruses.

12. The computer system of claim 7, wherein the encrypted query is based on an initial query by a first entity of the LAN to query a second entity of the external network, wherein the homomorphic encryption scheme used in the encrypting the initial query to produce the encrypted query is a second homomorphic encryption scheme, and wherein the secret key received from the first security domain is generated using a first homomorphic encryption scheme.

13. A computer program product comprising:
a computer readable storage medium having program instructions embodied therewith, the program instructions executable by a computer to perform a method comprising:
receiving, by a security zone between a first security domain and a second security domain, the first security domain being a higher-level security domain than the second security domain, an encrypted result from the second security domain, wherein the first security domain comprises a local area network (LAN), the second security domain comprises an external network that is external to the LAN and that includes external network nodes, and the security zone comprises a perimeter network between the LAN and the external network, and wherein the encrypted result is generated by the second security domain based on an encrypted, encoded query produced using a homomorphic encryption scheme, and further based on the second security domain comparing the encrypted, encoded query with each of a plurality of encoded key-values of a key-value database to obtain a plurality of encrypted comparison results and using the plurality of encrypted comparison results and a plurality of corresponding encoded address values to mathematically compute the encrypted result;

receiving, by the security zone, a secret key from the first security domain, and decrypting, in the security zone, the encrypted result using the secret key to generate a result; and passing the result to the first security domain.

14. The computer program product of claim 13, wherein the encrypted query is based on an initial query by a first entity of the LAN to query a second entity of the external network, wherein the encrypted result is generated from performance of an oblivious query based on the encrypted query, and the encrypted query is produced based on encryption of the initial query using the homomorphic encryption scheme.

15. The computer program product of claim 14, wherein the encryption of the initial query using the homomorphic encryption scheme is based on the initial query being successfully validated by ensuring that the first entity of the LAN is authorized to request the initial query to query the second entity of the external network.

16. The computer program product of claim 13, wherein the security zone is shared between the first security domain and the second security domain.

17. The computer program product of claim 13, wherein the method further comprises validating the result, the validating comprising ensuring that the result is valid and free from viruses.

18. The computer program product of claim 13, wherein the encrypted query is based on an initial query by a first entity of the LAN to query a second entity of the external network, wherein the homomorphic encryption scheme used in the encrypting the initial query to produce the encrypted query is a second homomorphic encryption scheme, and wherein the secret key received from the first security domain is generated using a first homomorphic encryption scheme.

* * * * *